3,524,791
MAN-MADE SUEDE AND METHOD OF
MAKING SAME
Donald C. Bethman, Richmond, Va., Joseph Jaeger, Seaford, Del., and William F. Manwaring, Madison, Tenn., assignors to E. I. du Pont de Nemours and Company, Wilmington, Del., a corporation of Delaware
Filed July 3, 1967, Ser. No. 650,787
Int. Cl. D04h *11/08*
U.S. Cl. 161—64
28 Claims

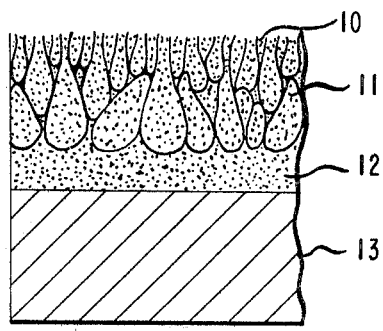
INVENTORS
DONALD C. BETHMAN
JOSEPH JAEGER
WILLIAM F. MANWARING
BY *Melville J. Hayes*
AGENT United States Patent Office 3,524,791
Patented Aug. 18, 1970

ABSTRACT OF THE DISCLOSURE

A very smooth and attractive man-made suede useful for shoe-uppers, upholstery and the like is prepared by (1) applying to a suitable fabric or other substrate a wetting liquid which is a coagulant for a polymer solution to be applied to the fabric, (2) coating the resulting pre-wet fabric with a layer of polymer solution, (3) coagulating, bathing and drying the layer of polymer solution under conditions which convert it to a solidified composite cellular structure having a coarse-pore layer on top of a fine-pore layer, and (4) subjecting the top surface to a napping operation wherein part of the coarse-pore layer is removed.

BACKGROUND OF THE INVENTION

This invention relates to man-made suede sheet materials, and to methods of manufacturing such sheet materials.

It is known in the art that shoe-upper materials, upholstery materials and the like having a suede-like upper surface can be prepared by providing a fabric having in superposed adherence therewith a cellular layer of polymeric material, and subjecting the top surface of the cellular layer to a napping operation wherein the surface is rubbed with sandpaper or the like until a nap is formed (e.g., by removal of the uppermost or skin-like portion of the as-formed cellular layer). The resulting product is often referred to as a man-made suede since it has tactile and appearance properties resembling those of the natural suedes made from tanned skins.

The previously-known methods of manufacturing man-made suedes have certain drawbacks which the industry has been trying to overcome. For example, in order to obtain a product having relatively good smoothness it has often been necessary to remove an excessive amount of the cellular layer during the napping operation. Also, there has been a decided tendency for the surface of the product to have a mottled non-uniform appearance. Product smoothness and uniformity are still often unsatisfactory even when using a substrate which has been prepared with great care and expense, for example a nonwoven fabric having a high level of smoothness, density and uniformity as the result of a complicated process comprising shrinking a carefully prepared fibrous web, vigorously needle-punching the web, impregnating it with a porous polymeric material, and subjecting it to closely-controlled heat and pressure while in contact with a smooth pressure member.

SUMMARY OF THE INVENTION

In a broad sense, the product of this invention is a sheet material having a suede-like upper surface and comprising
(A) a porous fibrous substrate,
(B) a predominantly fine-pore layer of porous polymeric material in superposed adherence with (A), about 75–100% of the pores therein having an average cross-section diameter of less than 20 microns, and
(C) a predominantly coarse-pore cellular layer of polymeric material in superposed adherence with layer (B), and having about 75–100% of its volume composed of contiguous elongated cells having an average cross-section diameter of about 20–200 microns, a substantially perpendicular orientation of their longest dimension in relation to the plane of the surface of the sheet, and thin microporous cell walls which, by virtue of their microporosity, render the cells intercommunicating.

Also provided by the present invention is a process which may be broadly defined as follows:
A process for preparing a sheet material having a suede-like upper surface, which comprises
(1) wetting at least one surface of a porous fibrous substrate with a wetting liquid which is a coagulant for the polymer solution described in step (2),
(2) Applying to the upper surface of said substrate a layer of a solution of a polymeric material in a liquid which is a solvent for the polymeric material,
(3) Bathing said layer of polymer solution with a bathing liquid adapted to coagulate said layer and to extract at least part of said solvent from said layer until said layer is coagulated and solidified in situ into a composite cellular layer containing a fine-pore layer beneath a coarse-pore layer as described in (B) and (C) of the previous paragraph, and until at least part of said solvent is extracted from said layer,
(4) Removing from said layer substantially all of any solvent remaining therein, and
(5) Drying the resulting composite sheet material.

BRIEF DESCRIPTION OF THE DRAWING

In the single figure of the attached drawing is an enlarged vertical cross-sectional view, somewhat diagrammatic and fragmentary in character, of the man-made suede product of Example 1 below. This product is comprised of a nonwoven fabric substrate 13, a fine-pore layer of moisture-permeable polymeric material 12 in superposed adherence with the substrate, a honeycomb-like coarse-pore cellular layer of moisture-permeable polymeric material 11 in superposed adherence with layer 12, the top surface 10 of the product being a suede-like surface formed by rubbing the upper surface of layer 11 with an abrasive member until a nap is formed.

DESCRIPTION OF PREFERRED EMBODIMENTS

Certain preferred embodiments of the product of this invention have one or more of the following features:
(1) The sheet material and layers (A), (B) and (C) are moisture-permeable and flexible;
(2) Substantially all the cells which form the upper surface of layer (C) have an open uppermost portion having an average cross-section diameter of about 20–200 microns, preferably about 50–100 microns;
(3) The sheet material has a permeability value of at least 750, preferably at least 2000, as determined by the test described by Kanagy and Vickers in the Journal of American Leather Chemists Association, 45, 211–242 (Apr. 19, 1950);
(4) The fine-pore layer (layer B) has a thickness of about 0.5–15 mils, preferably about 1–8 mils; the pores in layer (B) communicate with one another;
(5) The coarse-pore cellular layer (layer C) has a thickness of about 5–40 mils;
(6) Component (A), the porous fibrous substrate, is a fabric, preferably a nonwoven fabric; an especially useful nonwoven fabric is one containing a solidified polymeric impregnant having a moisture-permeable structure; such a nonwoven fabric can be prepared for example by the procedure described in Example 1 of U.S. Pat. 3,067,483 issued Dec. 11, 1962, to J. L. Hollowell;
(7) The polymeric material of layers (B) and (C) has a secant tensile modulus at 5% elongation (defined below) of over 600 p.s.i., preferably about 800–3000 p.s.i.

(8) The polymeric material of layers (B) and (C) contains about 51–100% by weight of a polyurethane polymer and up to about 49% by weight of a vinyl chloride polymer, based on the weight of polymer in said material; particularly preferred for shoe-upper and upholstery products is a 60/40 to 75/25 blend of a polyurethane elastomer and a vinyl chloride polymer selected from the group consisting of polyvinyl chloride and copolymers of a major proportion, preferably at least 80%, of vinyl chloride and a minor proportion of another ethylenically unsaturated monomer, such as vinyl acetate, vinylidene chloride, or diethyl maleate; and (9) About 50–100% of said elongated cells in layer (C) have a tapered shape such that their diameters become progressively smaller from the bottom to the top of the layer.

Preferred embodiments of the process of the present invention have one or more of the following features:

(a) The polymeric material used in step (2) has a secant tensile modulus at 5% elongation of over 600 p.s.i. preferably about 800–3000 p.s.i.;

(b) Subsequent to the bathing step (step 3), the upper surface of the sheet material is rubbed with sandpaper or other suitable abrasive member until a nap is formed;

(c) Either just before or just after the drying step (step 5), enough of the uppermost portion of the composite cellular layer is removed (e.g., by employing suitable abrasive or cutting means) so that substantially all the cells which form the upper surface of the sheet material have an open uppermost portion having an average cross-section diameter of about 20–200 microns;

(d) The substrate is a fabric, and the polymer solution applied in step (2) has a polymer solids content of about 10–30% by weight and a viscosity of about 10–500 poises at 24° C.;

(e) The layer of polymer solution applied in step (2) is thick enough so that the coarse-pore layer formed in step (3) has a thickness of about 6–40 mils;

(f) Step (1) (the substrate wetting operation) is carried out prior to step (2) (the application of the polymer solution); it is also possible, however, to carry out the substrate wetting operation between steps (2) and (3), for example, by applying the polymer solution to the top of the substrate (applying a wetting liquid to the bottom of the substrate, and then bathing the layer of polymer solution;

(g) Step (1) is carried out by immersing the substrate in the wetting liquid and then removing any excess wetting liquid from the substrate;

(h) The wetting liquid is applied to the substrate by means of a roller having an absorbent surface containing the wetting liquid;

(i) The wetting liquid used in step (1) and the bathing liquid used in step (3) both are selected from the group consisting of water and mixtures of water with water-miscible organic liquids wherein the water content is at least 51%, preferably at least 75%, by weight;

(j) The substrate, just prior to step (2), has a wetting liquid content of about 0.5–70%, preferably about 10–60%, based on the combined weight of substrate and wetting liquid; and (k) The liquid component of the polymer solution used in step (2) consists essentially of about 98–100% by weight of a water-miscible organic solvent and about 0–2% by weight of water; said organic solvent is preferably dimethylformamide, or a mixture of dimethylformamide with methyl ethyl ketone wherein the dimethylformamide content is at least 51%, preferably at least 75%, by weight.

The wetting of the substrate with the wetting liquid can be done by applying the desired amount of wetting liquid to the substrate by any suitable method, including methods known to be useful for applying liquids to fabrics and the like. The wetting liquid is preferably water or a mixture of a major proportion of water and a minor proportion of an organic liquid, for example, dimethylformamide or an aliphatic alcohol containing 1–4 carbon atoms. Water-free organic liquids which are coagulants for the polymer solution used in step (2), and which are miscible with the bathing liquid used in step (3), are also sometimes useful. If one does not obtain the desired composite cellular layer during the bathing operation of step (3), this may indicate either that not enough wetting liquid was applied to the substrate during step (1), or the wetting liquid used was not a suitable coagulant for the polymer solution.

A preferred method of applying the wetting liquid to the fabric or other substrate when step (2) follows step (1) comprises immersing the fabric in a tank filled with the wetting liquid, followed by passing the wet fabric between squeeze rolls or other means adapted to remove any excess wetting liquid. Other useful methods of applying the wetting liquid to the fabric include spraying, roller-coating and exposing the fabric to the wetting liquid in vapor form, for example, in a steam bath or in a humidity chamber having a relative humidity of about 90–100%.

A useful method of applying the wetting liquid when step (2) follows step (1), as well as when step (2) precedes step (1), comprises passing the fabric or other substrate under tension over a substantial portion of the circumference of a roller covered with an absorbent covering material attached thereto and saturated with the wetting liquid so that the wetting liquid is applied to the bottom surface of the fabric. In this method, the bottom portion of the roller can be immersed in a tank of the wetting liquid, thereby keeping the absorbent roller-covering saturated during continuous application of the wetting liquid to the fabric. An extremely useful material to employ as the absorbent roller-covering is cellulose sponge cloth prepared according to the teaching of U.S. Pat. 3,068,545 isssused to Stiner on Dec. 18, 1962.

The porous fibrous substrate to which the wetting liquid and the layer of polymer solution are applied in practicing this invention can be, for example, a woven fabric, a knitted fabric, a fibrous sheet made by paper-making techniques, or a nonwoven fabric of any suitable natural fibers or any synthetic fibers or blends thereof. Also useful are composite substrates, for example, a substrate formed by assembling a woven fabric in face-to-face contact with a nonwoven fabric. When using a composite substrate, the wetting liquid is applied to at least one of the substrate layers. A substrate is used which is made of materials that do not dissolve to any harmful extent in any solvent present in the wetting and bathing liquids and in the polymer solution. The substrate is "porous" in the sense that it is capable of absorbing or taking on the wetting liquid in step (1) of the present process in an amount sufficient to enable the composite coarse-pore/fine-pore cellular layer to be formed.

The liquid component of the polymer solution used in step (2) can contain a small proportion of a nonsolvent for the polymeric material; for example, after forming a solution of the polymeric material in a good polymer solvent, a nonsolvent for the polymeric material which is miscible with the solvent can be added in an amount which does not prevent the resulting blended liquid component from being a solvent for the polymeric material. The addition of too much nonsolvent will transform the solution into a hazy-appearing substantially colloidal dispersion of polymer particles which will fail to form the coarse-pore layer (C) as described above during the bathing operation. N,N-dimethyl formamide is a highly useful solvent for the polymers soluble therein in view of its high solvent power for many of the preferred polymers as well as its high miscibility with the generally preferred nonsolvent liquids including water. Other useful solvents include dimethyl sulfoxide, tetrahydrofuran, tetramethyl urea, N,N-dimethyl acetamide, N-methyl-2-pyrrolidone, ethyl acetate, doxane, butyl carbinol, toluene, phenol, chloroform, and gamma-butyrolactone. Also useful are blends of these solvents with various water-miscible liquids, such as ketones and alcohols and which alone are often poor solvents for the polymer.

The polymeric material of the polymer solution can contain one or more additives, such as curing agents, coloring agents, plasticizers, stabilizers and fillers. The polymer solution can contain a thixotropic agent.

Among the polymers which can be present in the polymer solution used in step (2) are those described in U.S. Pat. 3,100,721, issued Aug. 13, 1963, to E. K. Holden. As indicated above, the polymeric materials of layers (B) and (C) preferably has a secant tensile modulus at 5% elongation of about 800–3000 p.s.i. The secant tensile modulus value is the ratio of the stress to the strain at 5% elongation of the polymer sample determined from the tensile stress-strain curve, and is expressed as force per unit area, e.g., pounds per square inch (often expressed as p.s.i.). The secant tensile modulus measurement is carried out according to ASTM D–882–64–T, modified as described below.

The secant tensile modulus of the polymer is determined by forming a 5- to 20-mil thick continuous void-free polymer film from a polymeric solution, for example, the solution to be used in step (2) to form the porous polymeric layer of the sheet material of this invention. The film is formed by casting the polymeric solution on a glass plate and the solution is then dried, e.g., at 105° C. for 90 minutes.

The stress-strain curve which is necessary to calculate the secant tensile modulus of the polymer is preferably obtained on an Instron Tensile Tester, using a ½-inch wide specimen cut from the void-free polymeric film, with about one inch between grips. The following settings are preferably used on the Instron Tester to obtain a stress-strain curve: chart speed of 10 inches per minutes, crosshead speed of 1 inch per minute, and a full scale load of 2 to 5 pounds.

The secant tensile modulus is obtained from the chart of the force vs. strain curve by drawing a line at 5% specimen elongation (strain) parallel to the force axis of the chart. The point at which this line intersects the force/strain curve defines the force in pounds necessary to elongate the specimen 5%. This force value is divided by the initial cross-sectional area of the specimen to give the corresponding stress value in pounds per square inch. This stress value is divided by the strain (0.05) to give the secant tensile modulus.

The layer of polymer solution can be applied to the substrate by any suitable known coating method, for example, by doctor-knifing, extruding, dipping, spraying, brushing and roller-coating.

During the bathing operation (step 3) the solution layer applied in step (2) is placed in contact with the bathing liquid, for example, by sudden immersion therein, by first floating the layer on top of a body of the bathing liquid followed by immersion therein, or by subjecting the layer to a spray of the bathing liquid followed by immersion therein. "Bathing" is intended to mean causing the bathing liquid, in liquid form—for example, as a unitary body or as a spray—to come in contact with the solution layer. At least the last portion of the bathing operation preferably employs a bathing liquid which can easily be removed from the sheet material by evaporation in a heat zone wherein the temperature is not high enough to be harmful to the product.

Step (4) can be included in step (3) when the bathing operation is carried out so that substantially all of said solvent is extracted from the coagulated cellular layer. Step (4) can also be carried out by employing other known or suitable methods (e.g., centrifuging) for removing solvents from porous materials.

The microporous cell walls of layer (C) generally make up a minor proportion of the total volume of the layer; the elongated voids defined by the cell walls, a major proportion. The coarse-pore cellular layer (layer C) of the sheet material of this invention has a cellular structure that is "honeycomb-like"; this means that it has a cell pattern resembling or suggesting that of a honeycomb with respect to general cell shape and arrangement when viewed in cross section under a microscope. This does not mean that the cells have exactly the same shape or size as those of a real honeycomb. The cellular structure of layer (C) is honeycomb-like in the fact that about 75–100% of its volume is composed of cells that are Contiguous, or in contact with one another;

Elongated, or greater in height than in average diameter;

Perpendicularly oriented—that is, they have a substantially perpendicular orientation of their longest dimension in relation to the plane of the surface of the sheet;

Shaped generally like a hollow cylinder—thus they are tubular or fistulous; and

Defined by cell walls that are quite thin in relation to the average cell diameter, the wall thickness usually being but a fraction (e.g., ¼ to ¹⁄₂₀ or less) of the cell diameter.

While the elongated cells of layer (C) generally have a substantially perpendicular orientation, in some embodiments of the invention a major proportion of these cells are slanted so as to form an angle of up to about 45 degrees relative to the plane of the surface of the sheet.

The process of this invention has beneficial utility for the manufacture of shoe-upper materials, upholstery materials and the like having a suede-like surface. Moisture-permeable man-made suedes can be prepared by this novel process which are surprisingly smooth and uniform in appearance. Excellent smoothness and uniformity are obtainable even when the napping operation is so mild that only a minor proportion of the cellular polymeric layer is removed. A product of unexpectedly high quality can be obtained even when the substrate is less smooth, less dense or less uniform in density than was required in previously known methods. The substrate can be an inexpensive fabric prepared by simple mass-production methods not requiring costly and complicated machinery and procedures to provide the necessary substrate smoothness, density and uniformity. Thus, the process of this invention enables one not only to improve the quality of man-made suedes but also to produce them at lower cost.

The examples which follow are given for the purpose of illustrating the invention. All quantities shown are on a weight basis unless otherwise indicated.

EXAMPLE 1

A breathable man-made suede having outstanding utility for the manufacture of shoe-uppers, upholstery and the like is prepared by (1) Providing a nonwoven fabric which (a) has been made from polyester fibers, (b) contains as a solidified polymeric impregnant a polyurethane elastomer having a porous moisture-permeable structure, (c) has been prepared generally in accordance with the teaching of Example 1 of U.S. Pat. 3,067,483 (mentioned above), (d) has a thickness of 40 mils, a density of 0.3 gram per cubic centimeter, a width of 3 feet and a length of 800 feet, and (e) has been wound up on a storage roll—this fabric is one that has not been subjected to a hot-pressing operation to improve the fabric smoothness, density and uniformity;

(2) Substantially uniformly wetting the fabric provided in step (1) by (a) continuously unwinding the fabric from the storage roll, (b) passing the fabric into a tank filled with water at 25° C., and (c) passing the immersed fabric out of the water tank and then passing it between a pair of squeeze rolls whereby the wetting liquid (water) content of the fabric is reduced to 44% based on the combined weight of fabric and water;

(3) Providing a solution of polymeric material by (a) making a polymer solution consisting of 10.1% polyurethane elastomer, 3.4% polyvinyl chloride and 86.5% dimethylformamide according to the following procedure: a 20% solution of polyurethane elastomer is prepared generally as described in U.S. Pat. 3,284,274, column 11, lines 57–75, which patent issued Nov. 8, 1966, to Hulslander et al.; then a suitable amount of the resulting polyurethane solution is mixed with a 12% solution in dimethylformamide of polyvinyl chloride; and then (b) mixing 90 parts of the solution resulting from step (a) with 10 parts of a pigmented polymer solution prepared by grinding 15 parts of carbon black in a ball mill with a solution of 22 parts of an 87/13 copolymer of vinyl chloride and vinyl acetate in 63 parts of methyl ethyl ketone; the temperature of the resulting polymer solution is adjusted to 27° C.;

(4) Coating the prewet fabric provided in step (2) with the polymer solution at 27° C. provided in step (3) by means of an extrusion coating apparatus in an amount sufficient to end up (at the end of step 4) with a 25-mil thick layer of the solution on the top surface of the fabric;

(5) Bathing the layer of polymer solution by (a) floating the coated fabric coating-side-down for 3 minutes on a tank of water at 20° C., (b) immersing the coated fabric in a tank containing water at 25° C. for 30 minutes, (c) immersing it in a tank of water at 65° C. for 3 minutes, and then (d) immersing it in a tank of water at 95° C. for 30 minutes, thereby completing the coagulation of the polymer and the leaching therefrom if organic solvent, step (5) causing the layer of polymer solution to coagulate and solidify in situ and become a composite cellular layer containing a fine-pore layer beneath a coarse-pore layer as described above in further detail with respect to layers (B) and (C) [also see FIG. 1 of the drawing];

(6) Drying the resulting 800 linear feet of sheet material for 4 minutes in an oven heated to 138° C.;

(7) Rubbing the upper surface of the sheet material with an abrasive member until a nap is formed and until enough of the coarse-pore layer (including a skin-like surface layer) is removed so that substantially all the cells which form the upper surface of the sheet material have an open uppermost portion having an average cross-section diameter of about 80 microns; this napping operation reduces the thickness of the coarse-pore layer from 16 mils to 12 mils. The napping operation employs a buffing machine equipped with a roller covered with sandpaper whose abrasive surface is made up of aluminum oxide particles, which is generally the same type of machine as commonly used for raising a nap on fabrics. An attractive smooth nap free of unbuffed low spots is obtained.

The polymer solution used in step (4) of Example 1 can be modified if desired with additives known to be useful in solution coating compositions, for example fillers, other pigments, and thixotropic agents.

The color of the bottom surface of the product can be modified if desired (preferably just before step (7)) by applying a known coating composition, for example, an aqueous dispersion of suitable pigments and polymers. And the color of the top surface can be modified if desired by applying a suitably colored coating composition. Also, the resistance of the upper surface of the product to becoming soiled or stained during use can be improved if desired by applying a known antisoiling coating composition, for example, an aqueous dispersion of suitable silicone polymers or fluorine-containing polymers plus a suitable dispersing agent. Either before or after step (7), the configuration of the surface of the sheet material can be modified if desired by known methods of providing 3-dimensional patterns in polymeric sheet material, for example, by employing a suitable embossing apparatus.

The product of Example 1 is a high quality man-made suede having a permeability value of 8,350. The product is unexpectedly smooth and uniform in appearance, and it has tactile and appearance properties resembling those of high-quality natural suede.

As can be seen in FIG. 1 of the attached drawing, the product contains a nonwoven fabric substrate 13, a fine-pore layer of moisture-permeable polymeric material 12 in superposed adherence with the substrate, a honeycomb-like coarse-pore cellular layer of moisture-permeable polymeric material 11 in superposed adherence with a layer 12, the top surface 10 of the product being a suede-like surface formed by rubbing the upper surface of layer 11 with an abrasive member until a nap is formed.

Nearly all of the pores in the fine-pore layer have an average cross-section diameter of less than 20 microns; and nearly all of the cells in the coarse-pore layer are tapered enlongated cells having an average cross-section diameter of about 100 microns The fine-pore layer has a thickness of about 5 mils, and the coarse-pore layer has a thickness of about 12 mils. The polymeric material of both portions of the composite cellular polymeric coating has a secant tensile modulus at 5% elongation of about 1200 p.s.i.

Substantially all of the sheet material produced in Example 1 (about 800 feet by 3 feet, or 2400 square feet) passes inspection by a skilled inspector as satisfactory for use in dress shoes. Shoes in which the product of Example 1 is used as the suede upper material have excellent appearance, smoothness, durability and comfort properties.

EXAMPLE 1A

For purposes of comparison, a sheet material outside the scope of this invention is prepared by repeating Example 1 except step (2) is omitted. Thus, the fabric is in the dry state just before it is coated with the polyer solution. The product has a coarse-pore layer (layer C as described above) in superposed adherence with the fabric; there is no fine-pore layer between the fabric and the coarse-pore layer.

Much of the product of Example 1A (e.g., about 30–40%) does not have satisfactory smoothness and appearance for use in dress shoes. There are many low spots in the surface on which little or no nap is formed during step (7). Moreover, the areas which do have a good nap usually have a mottled nonuniform appearance. The product of Example 1 is much more useful than the product of Example 1A for the manufacture of shoes, upholstery and the like.

EXAMPLE 2

Results similar to those obtained in Example 1 are obtained by repeating Example 1 except step (2) (the wetting of the fabric) is carried out by passing the fabric under tension over about half of the circumference of a 4-inch diameter rotating roller covered with an absorbent covering material saturated with water at 25° C. so that the water is applied to the bottom surface of the fabric. The lower portion of the roller is immersed in a tank of water. The absorbent covering on the roller is cellulose sponge cloth prepared generally in the manner described in U.S. Pat. 3,068,545. At the end of step (2) the fabric has a wetting liquid (water) content of 10% based on the combined weight of fabric and water. The thickness of the fine-pore layer between the fabric and the coarse-pore layer is 1 mil as compared with the 5-mil thickness obtained in Example 1. The product is very smooth and uniform in appearance.

We claim:

1. A sheet material having a suede-like upper surface and comprising
   (A) a porous fibrous substrate, (B) a predominantly fine-pore layer of porous polymeric material in superposed adherence with (A), about 75–100% of the pores therein having an average cross-section diameter of less than 20 microns, and (C) a predominantly coarse-pore cellular layer of polymeric material in superposed adherence with layer (B), and having about 75–100% of its volume composed of contiguous elongated cells having an average cross-section diameter of about 20–200 microns,
a substantially perpendicular orientation of their longest dimension in relation to the plane of the surface of the sheet, and
thin microporous cell walls which, by virtue of their microporosity, render the cells intercommunicating.

2. A sheet material according to claim 1 wherein the sheet material and layers (A), (B) and (C) are moisture-permeable and flexible.

3. A sheet material according to claim 2 wherein substantially all the cells which form the upper surface of layer (C) have an open uppermost portion having an average cross-section diameter of about 20–200 microns.

4. A sheet material according to claim 3 having a permeability value of at least 750.

5. A sheet material according to claim 3 having a permeability value of at least 2000.

6. A sheet material according to claim 3 wherein layer (B) has a thickness of about 0.5–15 mils.

7. A sheet material according to claim 3 wherein layer (B) has a thickness of about 1–8 mils.

8. A sheet material according to claim 4 wherein layer (C) has a thickness of about 5–40 mils.

9. A sheet material according to claim 3 wherein component (A) is a fabric.

10. A sheet material according to claim 9 wherein said fabric is a nonwoven fabric.

11. A sheet material according to claim 3 wherein the polymeric material of layers (B) and (C) has a secant tensile modulus at 5% elongation of over 600 p.s.i.

12. A sheet material according to claim 11 wherein said polymeric material contains about 51–100% by weight of a polyurethane polymer and up to about 49% by weight of a vinyl chloride polymer, based on the weight of polymer in said material.

13. A sheet material according to claim 3 wherein about 50–100% of said elongated cells in layer (C) have a tapered shape such that their diameters become progressively smaller from the bottom to the top of the layer.

14. A process for preparing a sheet material having a suede-like upper surface, which comprises
(1) wetting at least one surface of a porous fibrous substrate with a wetting liquid which is a coagulant for the polymer solution described in step (2),
(2) applying to the upper surface of said substrate a layer of a solution of a polymeric material in a liquid which is a solvent for the polymeric material,
(3) bathing said layer of polymer solution with a bathing liquid adapted to coagulate said layer and to extract at least part of said solvent from said layer until said layer is coagulated and solidified in situ into a composite cellular layer containing a fine-pore layer beneath a coarse-pore layer as described in (B) and (C) of claim 1, and until at least part of said solvent is extracted from said layer,
(4) removing from said layer substantially all of any solvent remaining therein, and
(5) drying the resulting composite sheet material, the upper surface of the sheet material being subjected to means adapted to produce a nap thereon.

15. A process according to claim 14 wherein, subsequent to step (4), the upper surface of the sheet material is rubbed with an abrasive member until a nap is formed.

16. A process according to claim 14 wherein, subsequent to step (4), enough of the uppermost portion of said composite cellular layer is removed so that substantially all the cells which form the upper surface of the sheet material have an open uppermost portion having an average cross-section diameter of about 20–200 microns.

17. A process according to claim 16 wherein said substrate is a fabric, and the polymer solution applied in step (2) has a polymer solids content of about 10–30% by weight and a viscosity of about 10–500 poises at 24° C.

18. A process according to claim 16 wherein the polymeric material mentioned in step (2) has a secant tensile modulus at 5% elongation of over 600 p.s.i., and the layer of polymer solution applied in step (2) contains an additive selected from the group consisting of pigments, fillers and thixotropic agents.

19. A process according to claim 18 wherein the layer of polymer solution applied in step (2) is thick enough so that the coarse-pore layer formed in step (3) has a thickness of about 6–40 mils.

20. A process according to claim 16 wherein step (1) is carried out prior to step (2).

21. A process according to claim 20 wherein step (1) is carried out by immersing the substrate in the wetting liquid and then removing any excess wetting liquid from the substrate.

22. A process according to claim 20 wherein the wetting liquid is applied to the substrate by means of a roller having an absorbent surface containing the wetting liquid.

23. A process according to claim 16 wherein the wetting liquid used in step (1) and the bathing liquid used in step (3) both are selected from the group consisting of water and mixtures of water with a minor amount of water-miscible organic liquid.

24. A process according to claim 23 wherein the substrate, just prior to step (2), has a wetting liquid content of about 0.5–70% based on the combined weight of substrate and wetting liquid.

25. A process according to claim 24 wherein said wetting liquid content is about 10–60%.

26. A process according to claim 24 wherein the liquid component of the polymer solution used in step (2) consists essentially of about 98–100% by weight of a water-miscible organic solvent and about 0–2% by weight of water.

27. A process according to claim 26 wherein said organic solvent is selected from the group consisting of dimethylformamide and mixtures thereof with a minor proportion of methyl ethyl ketone.

28. A process according to claim 27 wherein the polymeric material mentioned in step (2) contains about 51–100% by weight of a polyurethane polymer and up to about 49% by weight of a vinyl chloride polymer, based on the weight of polymer in said material.

References Cited

UNITED STATES PATENTS

| | | | |
|---|---|---|---|
| 2,657,151 | 10/1953 | Gensel et al. | 117—47 |
| 3,067,483 | 12/1962 | Hollowell. | |
| 3,100,721 | 8/1963 | Holden. | |
| 3,238,055 | 3/1966 | Brightwell | 117—140 XR |
| 3,276,901 | 10/1966 | Lowell et al. | 117—63 |
| 3,284,274 | 11/1966 | Huslander et al. | |
| 3,369,925 | 2/1968 | Matsushita et al. | 117—63 |
| 3,384,502 | 5/1968 | Japs | 117—140 |
| 3,403,046 | 9/1968 | Schwacke | 117—135.5 |
| 3,418,198 | 12/1968 | Einstman | 117—63 |
| 3,449,153 | 6/1969 | Saligny et al. | 117—63 |

ROBERT F. BURNETT, Primary Examiner

R. H. CRISS, Assistant Examiner